United States Patent
Lewis

[15] 3,678,273
[45] July 18, 1972

[54] METHOD OF MEASURING THE ABRASIVENESS OF AN ABRASIVE FLUID

[72] Inventor: Donald R. Lewis, Houston, Tex.
[73] Assignee: Shell Oil Company, New York, N.Y.
[22] Filed: Feb. 11, 1970
[21] Appl. No.: 10,545

[52] U.S. Cl. .................250/83 R, 250/43.5 MR, 250/106 T
[51] Int. Cl. .........................................................G01t 1/16
[58] Field of Search.................250/83 R, 106 T, 43.5 MR

[56] References Cited
UNITED STATES PATENTS 2,433,718  12/1947  Teplitz.........................250/106 T X
2,658,724  11/1953  Arps............................250/106 T X Primary Examiner—James W. Lawrence
Assistant Examiner—Davis L. Willis
Attorney—Louis J. Bovasso and J. H. McCarthy

[57] ABSTRACT

A method of measuring the abrasiveness of an abrasive fluid by exposing a radioactive abradable material to a flow of the abrasive fluid, and measuring the rate at which radiation is being emitted from the fluid-contacted radioactive abradable material. The decrease due to an abrading away of the radioactive abradable material that occurs in the rate at which the radiation is emitted from the fluid-contacted radioactive abradable material is measured. The amount of abrasion of the abradable material is then used to measure the abrasiveness of the abrasive fluid.

4 Claims, 7 Drawing Figures

PATENTED JUL 18 1972　　　3,678,273

INVENTOR:
DONALD R. LEWIS
BY: Louis J. Bovasso
HIS ATTORNEY

METHOD OF MEASURING THE ABRASIVENESS OF AN ABRASIVE FLUID

BACKGROUND OF THE INVENTION

1. Field of the Invention

The invention relates to the measurement of the wear of surfaces; and, more particularly, to the measurement of the abrasiveness of an abrasive fluid.

2. Description of the Prior Art

It has been known to measure the wear of objects by determining the loss of weight or the decrease in dimensions of these objects. These methods of measurement have the drawbacks of lacking sufficient accuracy when dealing with very small amounts of wear, and of being applicable only after the completion of a run of the fluid and not during the progress thereof.

SUMMARY OF THE INVENTION

It is an object of this invention to provide an improved method of measuring the abrasiveness of an abrasive fluid.

It is a further object of this invention to provide a method of accurately measuring the abrasiveness of an abrasive fluid during the running of the fluid.

These and other objects are preferably accomplished by exposing a radioactive abradable material to a flow of the abrasive fluid and measuring the rate at which radiation is being emitted from the fluid-contacted radioactive abradable material. The decrease due to an abrading away of the radioactive abradable material that occurs in the rate at which the radiation is emitted from the fluid-contacted radioactive abradable material is measured. The amount of abrasion of the abradable material is then used to measure the abrasiveness of the abrasive fluid.

DESCRIPTION OF THE PREFERRED EMBODIMENT

Figure 1:
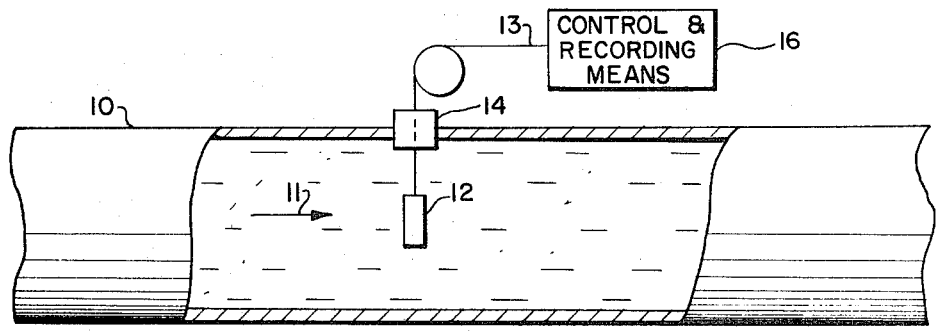
FIG. 1 is a vertical sectional view of an abrasive fluid flowing within a conduit being treated in accordance with the techniques of my invention.

Referring to the drawing, a conduit 10 is shown having an abrasive fluid flowing therein in the direction of the arrow 11. Such fluid may be a gas or liquid and contain various types of particles therein, the abrasiveness of which it is desired to measure. For example, the conduit 10 may form a portion of a pipeline carrying a slurry oil therein in which catalytic particles are contained, as for example, in a catalytic cracker. Such particles may in time abrade away valves, pumps, etc.. Thus, it is desirable to accurately measure the abrasiveness of the abrasive fluid (i.e., for example, the oil slurry containing the catalytic particles therein). Preferably, before measuring the abrasiveness of the fluid, the corrosion caused by such fluid flow is substantially reduced or eliminated by any convenient means known in the art.

Figure 2:
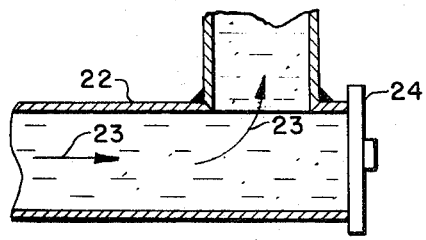
FIG. 2 is a vertical sectional view of a modification of the conduit of FIG. 1.
Figure 3:
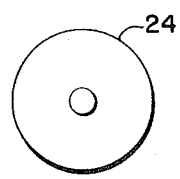
FIG. 3 is a detailed end view of the detector of the conduit of FIG. 2.
Figure 4:
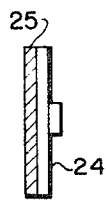
FIG. 4 is an end view of the detector of FIG. 3.

In carrying out the techniques of my invention, a radioactive detector 12 is extended, as for example, by means of a cable 13, through a conventional fluid seal 14 mounted in conduit 10 into contact with the abrasive fluid flowing therein. However, the manner of exposing detector 12 to the fluid in conduit 10 may obviously be carried out by various means and such manner of exposure forms no part of my invention. For example, the detector 12 may take the form of a flat disc mounted in a plug, such as a bullplug, that closes one conduit of a branch such as a T in a flowline as illustrated in FIG. 2. Here, T-shaped conduit 22 has the abrasive fluid flowing therein in the direction of arrows 23. A bullplug 24 closes the end of the run of conduit 22. Plug 24 (Fig. 3) is generally disc-shaped and has a coating 25 (FIG. 4) thereon similar to the coating of detector 12 of FIG. 1 as will be explained further hereinbelow. Coating 25 may be on one side of plug 24 only, that is, the side of plug 24 exposed to the flowing fluid.

Figures 5, 6:
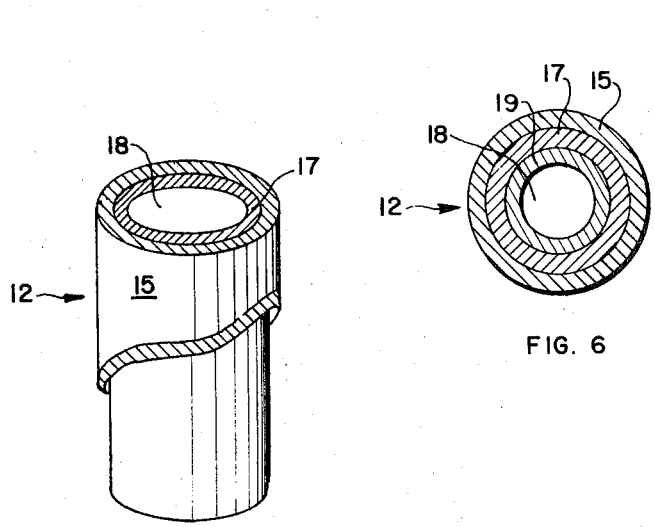
FIG. 5 is a detailed view, partly broken away, of the detector of the apparatus of FIG. 1.
FIG. 6 is a top plan view of the detector of FIG. 2.

Preferably, detector 12 is a radiation device which is coated on its exterior surface with a radioactive coating 15 (FIG. 5). As the amount of the radioactive coating 15 is reduced by the abrasion of the coating 15 by the particles in the flowing fluid, the count rate from the detector 12 (FIG. 1) decreases, such decrease being directly proportional to the extent of the abrasion. The amount of abrasion for constant fluid flow conditions varies with the amount of particles in the flowing fluid stream and permits an estimate of the particle content therein.

Control and recording means 16 are coupled to detector 12 for controlling the extent of detector 12 into the fluid stream and recording the abrasion of the detector 12. Detector 12 is preferably an integrating detector so that the abrasion effect is cumulative and the count rate need be sampled only at intervals rather than monitored continuously to determine the concentration of particles in the flowing fluid. If the detector 12 is monitored continuously, however, the average rate of decrease in its count rate may be related to the average rate of concentration of the particles in the flowing fluid.

Detector 12 may include, but is not limited to, a Geiger-Mueller tube, a solid-state barrier-layer detector, a scintillometer or any other type of radiation detector appropriate to respond to the radioisotopes used on the exterior coating 15 of the detector 12. The sensitivity of the detector 12 to the abrasive material in the flowing fluid may be varied by incorporating the radioisotopes of coating 15 in coating materials of different responses to abrasion. For example, metal films with different hardness, plastic coatings, or combinations may be used to give sensitivity to low particle contents and continuing response at high particle content.

The total amount of radioactive isotope used in coating 15 is determined by the maximum counting rate capability of the radiation detector 12. The counter portion of detector 12 preferably counts initially at as high a rate as possible without excessive loss of counting efficiency or coincidence losses. As abrasion of coating 15 occurs, the reduction in count rate it then directly proportional to the loss of material from coating 15.

Preferably, the coating 15 to be abraded is placed on an external sleeve 17 (FIG. 5) which fits over the body 18 of the detector 12 thus permitting easy and economical replacement.

In certain applications, deposits of the elements of the flowing abrasive fluid may be formed on coating 15. To prevent such accumulation, a conventional thin layer electric heater 19 may be placed between detector body 18 and the external sleeve 17 for heating the surface of detector 12 as shown in FIG. 6.

Figure 7:
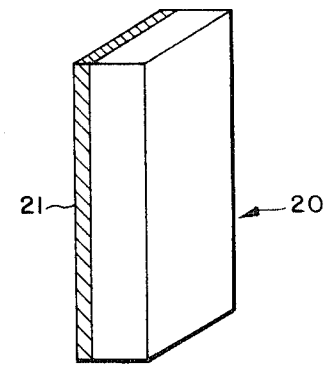
FIG. 7 is an isometric view of a further modification of a detector.

In the foregoing embodiments, the thickness of the layers of coating 15 may be varied to provide an extended range of particle detection. Although detector 12 is shown as cylindrical in FIGS. 1, 5 and 6, it may take other configurations, such as the disc-shaped detector of FIGS. 2 through 4 or the rectangularly-shaped detector 20 of FIG. 7. In this embodiment, as in the disc 24 of FIGS. 2 through 4, the abradable coating 21, similar to coatings 15 and 25, may be on one side of the detector only. In this embodiment, and in similarly irregularly shaped detectors, only the side facing upstream of the fluid flowing in conduit 10 is coated. Such coating gives the maximum range of counting rates from the initial to the final useful operating condition of the detector. The shape of the detector and its orientation in the flowing fluid stream is selected to give the most useful rates of abrasion for the particular set of fluid flow conditions involved.

The actual amount of radioactive isotope present in the coatings is preferably very small. For example, a few microcuries, such as 3.7 × 10⁴ disintegrations/second, of radioisotope gives initial count rates of approximately 1 million counts per minute. Although radioisotopes emitting any kind of radiation may be used in principle, gamma emitters are preferably used because of the energy required to penetrate the sensitive volume of the detector. The half-life of the radioisotope is preferably long compared to the observation period of the detector so that no significant decrease in count rate occurs due to natural radioactive decay. In one application of the teachings of my invention, a base disc of nickel-plated steel having one surface of one microcurie of Cobalt-60 coplated with nickel has been used to form the abradable coating.

The techniques of my invention as disclosed hereinabove may be used at readily accessible or remote locations. At accessible locations portable detectors may be used to measure, for example, the rate in units such as milliroentgens per hour at which the radioactive energy is received by the detector. At remote locations, the detector may be combined with means for telemetering a signal proportional to the measurements to a convenient location.

In all of the foregoing embodiments, the shape of the detector and the composition and placement of the coating may be varied in accordance with the specific use desired.

I claim as my invention:

1. In a method of measuring the abrasiveness of an abrasive fluid the steps of:
    exposing a radioactive abradable material that is coated on a detector that responds to its radiation to a flow of said abrasive fluid;
    measuring the rate at which radiation is being emitted from the fluid-contacted radioactive abradable material; and
    measuring the decrease, due to an abrading away at least some of said radioactive abradable material, that occurs in the rate at which the radiation is emitted from the fluid-contacted radioactive abradable material.

2. The method of claim 1 wherein the step of placing a detector having a radioactive coating in the path of said flowing fluid includes the step of placing a detector having an external sleeve with a removable radioactive coating therein in the path of said flowing fluid.

3. The method of claim 2 including the step of placing a thin layer electric heater between the body of said detector and said sleeve for heating the coating of said detector.

4. The method of claim 1 wherein the step of exposing a radioactive abradable material to a flow of said abrasive fluid includes the step of exposing a detector having a gamma emitter coating thereon to the flow of said abradable fluid.

* * * * *